United States Patent [19]

Sperry et al.

[11] Patent Number: 5,255,847

[45] Date of Patent: Oct. 26, 1993

[54] TIP FOR A FOAM IN PLACE INJECTION CARTRIDGE

[75] Inventors: Charles R. Sperry, Springfield, Vt.; Henry Ruddy, Sandy Hook, Conn.; Laurence B. Sperry, Brookline, Mass.

[73] Assignee: Sealed Air Corporation, Saddle Brook, N.J.

[21] Appl. No.: 767,033

[22] Filed: Sep. 26, 1991

[51] Int. Cl.$^5$ ............................................. B05B 15/02
[52] U.S. Cl. ................................. 239/112; 239/117; 222/148; 141/91; 134/166 R; 137/240
[58] Field of Search .............. 222/145, 148, 190, 149, 222/152; 239/106, 112, 113, 115–118, 93, 99, 433; 141/90, 91; 134/166 R, 169 R; 184/55.1, 55.2, 58; 425/227, 228, 543; 137/240

[56] References Cited

U.S. PATENT DOCUMENTS

| | | | |
|---|---|---|---|
| 4,568,003 | 2/1986 | Sperry et al. | 222/448 X |
| 4,708,263 | 11/1987 | le Granse | 222/148 X |
| 4,800,708 | 1/1989 | Sperry | 53/449 |
| 4,854,109 | 8/1989 | Pinarer et al. | 53/397 |
| 4,898,327 | 2/1990 | Sperry et al. | 239/1 |
| 4,983,103 | 1/1991 | Ogawa | 222/148 X |
| 4,999,975 | 3/1991 | Wilden et al. | 53/451 |
| 5,180,082 | 1/1993 | Cherfane | 222/149 X |
| 5,186,905 | 2/1993 | Bertram et al. | 239/88 X |

*Primary Examiner*—Andres Kashnikow
*Assistant Examiner*—Kenneth DeRosa
*Attorney, Agent, or Firm*—Bell, Seltzer, Park & Gibson

[57] ABSTRACT

A cleaning system is disclosed for pumping compressed air and cleaning solvent to the injection cartridge of a foam-in-place packaging system. The cleaning system comprises a solvent tank for containing a stock supply of solvent; a source of compressed air; and an air-activated submersible solvent pump in air flow communication with the compressed air source. The system also includes an injection cartridge of a foam-in-place packaging system in liquid communication with the solvent pump; and a regulator in air flow communication with the compressed air source, the pump, and the injection cartridge. The regulator distributes compressed air to operate the pump and to travel with solvent to the injection cartridge to provide a cleaning mixture of solvent and air to the cartridge.

1 Claim, 3 Drawing Sheets

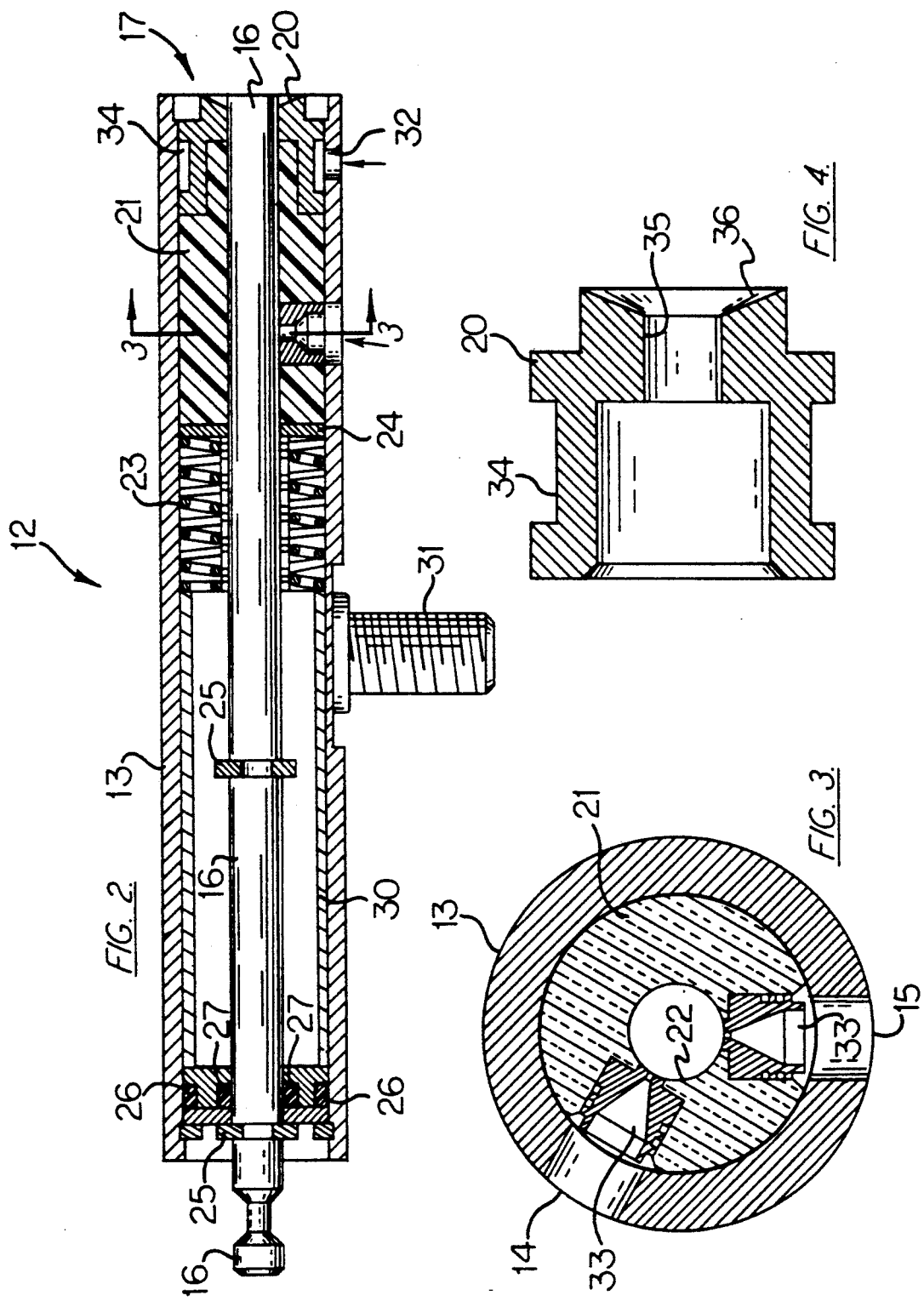

TIP FOR A FOAM IN PLACE INJECTION CARTRIDGE

FIELD OF THE INVENTION

The present invention relates to the production of foam-in-place packaging bags, and in particular relates to an improved solvent pumping and cleaning system for the injection cartridges used to inject foamable compositions into bags as they are being made. This application is related to co-pending application Ser. No. 07/766,810, filed concurrently herewith for "High Speed Apparatus for Forming Foam Cushions for Packaging Purposes," which is incorporated entirely herein by reference.

BACKGROUND OF THE INVENTION

The nature of the production of foam-in-place packaging, and the development of automated machinery for producing foam-in-place bags, is thoroughly described in U.S. Pat. Nos. 4,800,708 and 4,854,109 which are assigned to the assignee of the present application and which are incorporated entirely herein by reference. Briefly, a foam-in-place bag is a product in which a small amount of a foamable composition is placed into a plastic bag as the bag is being formed from stock plastic material. If the bag containing the foamable composition is placed within a container such as a cardboard box within a short time after being formed, the rising foam will fill the container while surrounding whatever fragile object may be in the box. If the container is closed as the foam rises, the result will be a custom package providing excellent protection for the object.

As further described in U.S. Pat. No. 4,898,327 ("the '327 patent") by the inventors of the present application and assigned to the common assignee of this application, one of the problems in such automated systems for forming foam-in-place bags is that the foamable compositions generally tend to harden rather rapidly after the foaming process is initiated. U.S. Pat. No. 4,898,327 is likewise incorporated entirely herein by reference. Thus, a common cartridge is for hardened foam to build up on the exterior of the nozzle from which the foamable compositions are injected into a bag being formed. As set forth in the '327 patent one method of addressing this problem is to clean the injection tip with solvent on a regular basis. In particular, in the '327 patent, it was discovered that the use of a sintered metal tip for the injection cartridge provided a novel cleaning method when a combination of solvent and compressed air was directed through the sintered tip. The action of forcing solvent and air through the sintered tip creates a frothing action of the solvent which helps keep the tip clean.

Additionally, a novel system for pumping the solvent to the tip was disclosed and claimed in the '327 patent.

After repeated successful use of the apparatus described in the '327 patent, however, it has been determined that there exists a further problem not originally recognized, and indeed raised by the nature of the improvement. Specifically, the typically used valving rod in an injection cartridge will not always return to the exact same position at the tip. Thus, foam could still build up, even though the frothing solvent was being passed through the sintered tip. As another factor, cartridge manufacture is such that the position of the valving rod with respect to the tip may differ enough from cartridge to cartridge to cause similar problems.

Accordingly, there exist a need for an improved sintered tip to take into account the inexact tolerances and position of a valving rod in the cartridges improved according to the '327 patent.

Additionally, the pumping system described in the '327 patent, although useful, offered some complexities of manufacture and operation, that could desirably be improved upon.

OBJECT AND SUMMARY OF THE INVENTION

Therefore, it is an object of the present invention to provide an improved porous sintered tip for an injection cartridge, and an improved simplified pumping system for the same purpose.

The invention meets this object by providing a sintered tip with an inverted frusto-conical geometry in which the inverted frusto-conical shape of the tip provides a greater linear area with respect to the operation of the valving rod over which the frothing action takes place, and thus accounts for the tolerance differences in the position of the valving rod from stroke to stroke, and from cartridge to cartridge.

The invention further provides a solvent pumping system from a stock supply to a desired location, namely the injection cartridge, in which the pumping system comprises a submersible expandable housing, a solvent inlet for filling the housing with solvent, and a solvent outlet formed of a shaft within the expandable housing. The shaft has a longitudinal core opening therethrough and respective first and second portions separable from one another with a sealed therebetween. The first portion is fixed to an opposite portion of the expandable housing from the second portion so that when the housing expands, the first and second portions of the shaft separate from one another to form an opening that allows solvent to enter the core and exit the shell. An air inlet opening is included for permitting compressed air to be directed into the housing to expand the housing and pressurize the solvent therein. The pressurized solvent is urged by the compressed air into the opening so that the pumping action of the pump is controlled by the flow of compressed air into the air inlet.

The foregoing and other objects, advantages and features of the invention, and the manner in which the same are accomplished, will become more readily apparent upon consideration of the following detailed description of the invention taken in conjunction with the accompanying drawings, which illustrated preferred and exemplary embodiments, and wherein:

DESCRIPTION OF THE DRAWINGS

FIG. 2 is a cross-sectional view of a typical injection cartridge for which the present invention is particularly applicable;

FIG. 3 is a cross-sectional view taken along lines 3—3 of FIG. 2;

FIG. 4 is a cross-sectional isolated view of a sintered porous tip for a cartridge according to the present invention.

DETAILED DESCRIPTION

Figure 1:
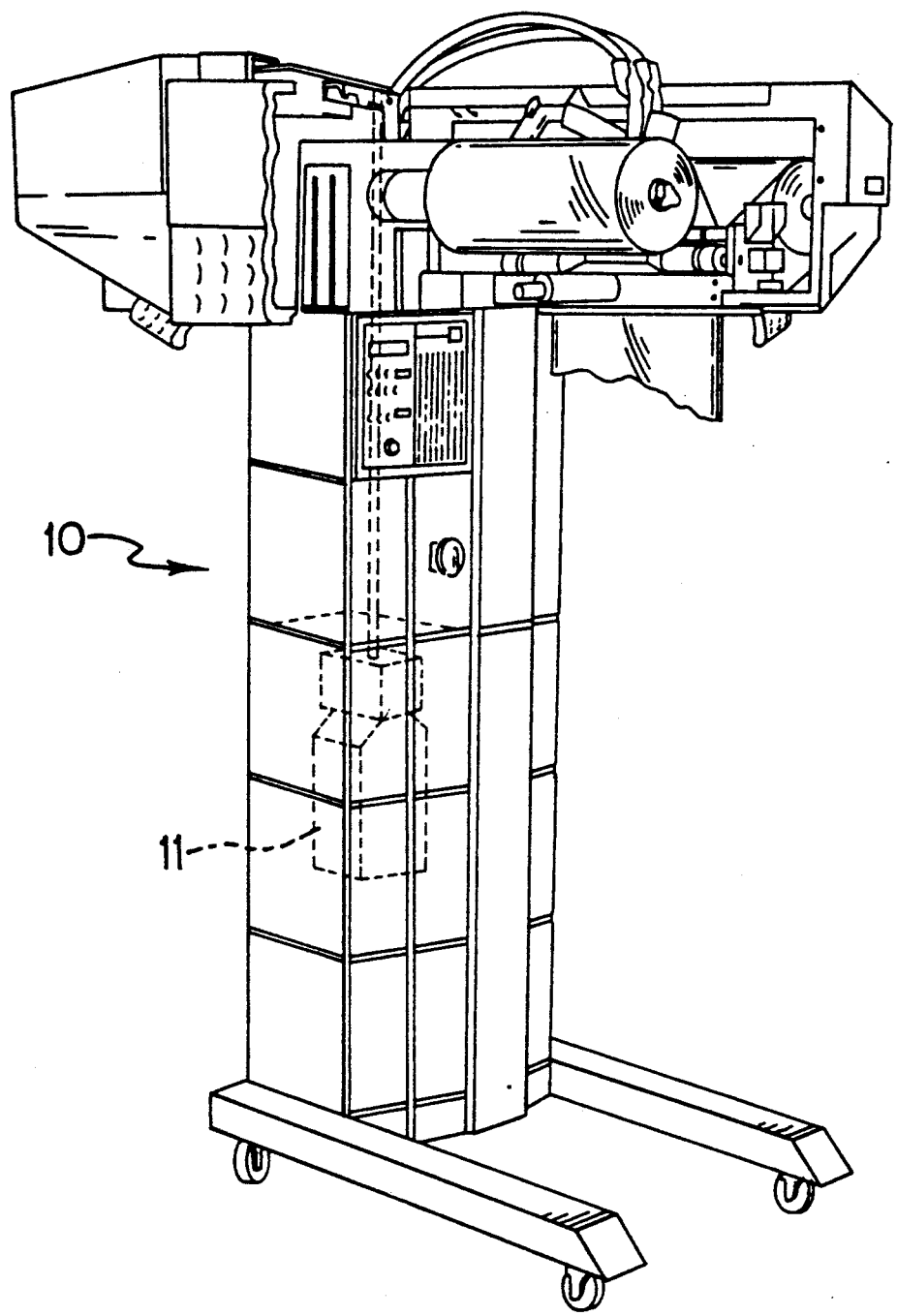
FIG. 1 is an overall perspective view of an improved foam-in-place bag manufacturing apparatus and showing the location of a solvent supply and pump according to the present invention.

FIG. 1 is a perspective view of a foam in place bag forming apparatus generally designated at . A typical location for a solvent supply is designated at 1 and illustrating an appropriate solvent tank. As stated earlier, the operation, and features of an apparatus such as the foam-in-place apparatus 10 are thoroughly described in co-pending application Ser. No. 07/766,810, filed concurrently herewith, and is also clearly set forth in U.S. Pat. Nos. 4,800,708; 4,854,109; and 4,898,327.

FIG. 2 shows a typical injection cartridge broadly designated at 12. The cartridge comprises a housing 13 and a pair of openings 14 and 15 in the housing through which the usual supply of two separate foam precursors enter. A valving rod 6 moves laterally within the housing. When fully retracted, the valving rod 16 leaves a fluid flow path between the openings 14 and 15 and one terminal end of the housing 13 broadly designated at 17 through which foam precursors can exit. In more detail, it will be seen that the cartridge further comprises the sintered tip 20, and a Core portion 21 which bears against the tip and which helps define the opening 22 through which the valving rod 16 moves in the housing. When two components are mixed to form the foamable composition (a typical situation) the opening 22 essentially defines a mixing chamber for the components. The cartridge 12 also includes a spring 23 that bears and urges a scraper 24 against the valving rod 16 as it moves, a pair of stop rings 25 on the valving rod 16 for defining its range of movement, a plurality of O-rings 26 and 27 for sealing the entire cartridge at its other terminal end, an inner housing portion 30 that maintains the spring 23 against the scraper 24, a mounting stud or threaded shaft 31 for mounting the entire nozzle on an appropriate fitting, and an opening 32 into which compressed air and solvent can be fed to the sintered tip 20.

The openings 14 and 15 also include specific foam injection fittings 33, an improved version of which are described in co-pending application Ser. No. 07/730,708, filed Jul. 16, 1991, to Bertram et al for "Improved Cartridge Part Design for Dispensing Foam Precursors," and assigned to the assignee of the present invention.

The sintered tip 20 is typically formed of a metal and includes an air-solvent mixing chamber 34, an opening 35 in the tip through which the valving rod 16 passes, and the inverted frusto-conical surface 36 of the tip 20 which provides the enhanced cleaning action.

FIG. 4 perhaps best illustrates the nature of this aspect of the invention and its advantages. It will be seen from FIG. 4 that when air and solvent are mixed in the mixing chamber 34, they exit the tip 20 and the entire nozzle assembly 12 through the frusto-conical surface 36. In essence, the frusto-conical portion 36 provides a linear dimension over which the frothing mixture will exit. As a result, the exact position of the valving rod 16 with respect to the tip 20 is not as critical as it is when the sintered tip has the conventional flat surface at which the solvent and air froth would exit only at one given linear location, rather than over a linear distance. It has been determined according to the present invention that this slight frusto-conical face greatly enhances the cleaning performance of the compressed air and solvent mixture.

As set forth in U.S. Pat. No. 4,898,327, although the tip is preferably formed of sintered metal, it is best described as being formed from a material that is porous to gases and certain liquids, but impermeable to other materials such as the foamable compositions that typically exit the injection cartridge.

Figure 5:
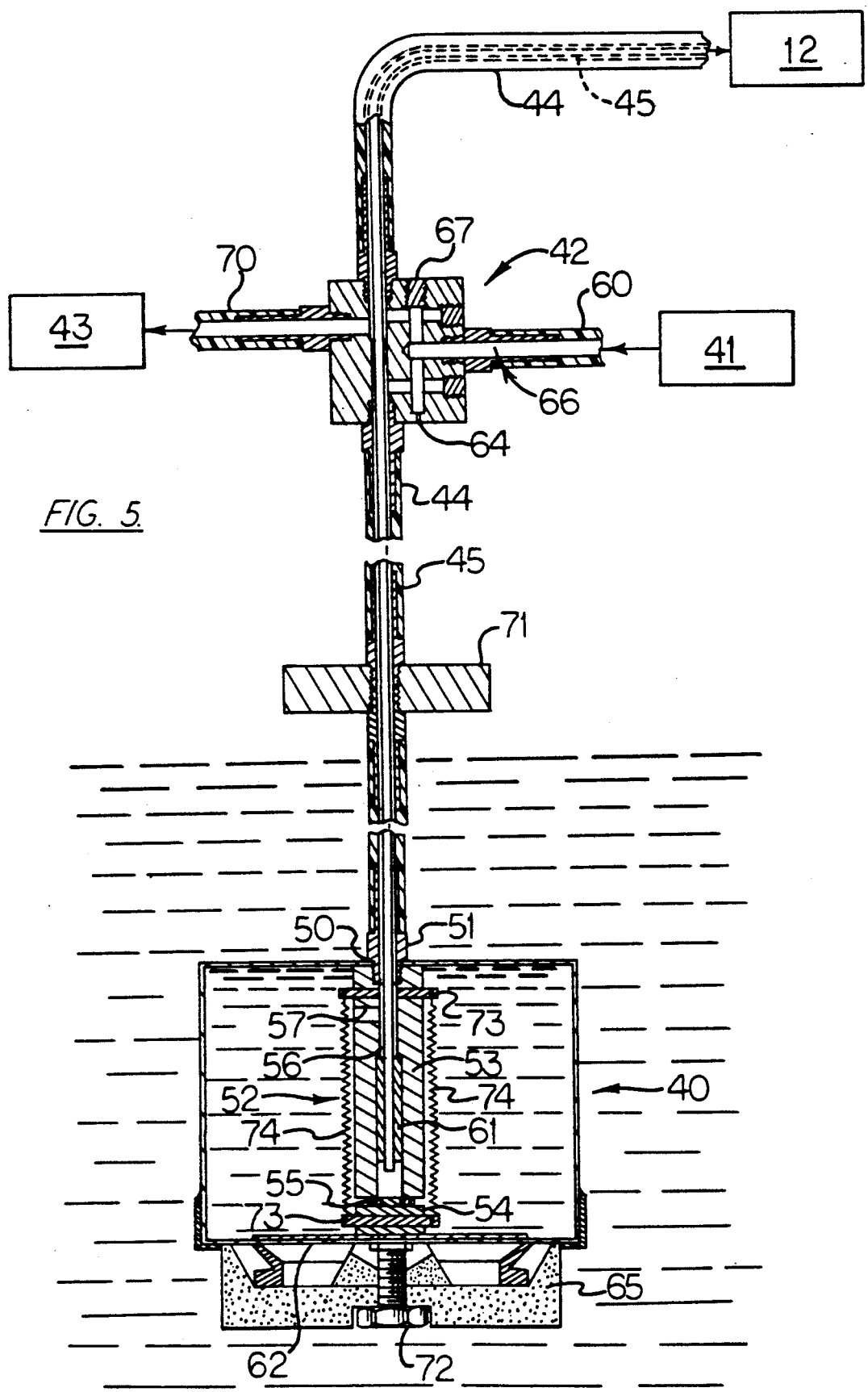
FIG. 5 is a cross-sectional view of the pump and regulator portions of the present invention.

In another aspect, the invention comprises the novel pumping structure illustrated in FIG. 5. In broadly designated terms, the pumping system comprises a submersible expandable pump 40, an air supply (preferably for compressed air) 41, a regulator 42 for operating the pump 40 and for directing a portion of compressed air away from the pump, a pressure transducer 43, an air flow communication path illustrated as the tubing 44, and a liquid flow path illustrated as the solvent tubing 45. For understanding the invention further, the injection cartridge is not shown in FIG. 5 but merely schematically designated by the box 12 indicating that the supply of air and solvent passing through respective tubes 44 and 45 are being pumped to the injection cartridge 12.

Turning to the pump in more detail, it first comprises a submersible expandable housing 46 which in the drawings is shown as having two portions soldered together at 47, but this represents a particular embodiment and not a requirement. The housing 46 includes an air inlet 50 with a threaded fitting 51 therein.

A solvent outlet is formed of a shaft broadly designated at 52 that has respective first and second portions 53 and 54 that are separable from one another with a seal illustrated as the O-ring 55 therebetween. The first portion 53 is fixed to an opposite portion of the expandable housing 46 from the second portion 54 so that when the housing 46 expands, the first and second portions 53 and 54 of the shaft 52 separate from one another to form an opening adjacent the O-ring 55 that allows solvent to enter the core 56 and exit the shell.

An air inlet opening 57 in the shaft 52 permits compressed air to be directed the remainder of the way into the housing 46 to expand the housing and pressurize the solvent therein to urge the solvent into the opening adjacent the O-ring 55 so that the action of the pump 40 is controlled by the flow of compressed air into the air inlet.

The sequence of operation of the pump can be described as follows. Compressed air from the source 41 flows through the compressed air tubing portion 60 and into the regulator 42. At the regulator 42, the air will flow in two directions: upwardly through air tubing 45 to the injection nozzle 12; and downwardly through the same tubing, but from an opposite portion of the regulator, toward the pump 4. As air travels through the tubing 44, it enters the housing through the air inlet opening 57. The compressed air pressurizes the solvent within the housing 46. Because the housing 46 is expandable, for example an expandable metal such as thin stainless steel, the top and bottom portions move apart from one another thereby separating top portion 53 of the shaft from bottom portion 54. This provides a small opening next to the O-ring 55 through which solvent can enter the core 56. The core, however, contains a seal 61 which prevents solvent from entering the air tubing 44 that enters the top of housing 46, and instead forces it into the solvent tube 45. The solvent is thus forced upwardly through the regulator and then to the injection nozzle 12 as illustrated. The appropriate and novel feature of the device is that a flow of compressed air 4 which is intended to mix with the solvent and froth at the sintered tip 20 also controls the operation of the pump 40, greatly simplifying the overall nature and operation of the device.

To replenish solvent in the pump, it will be understood that atmospheric pressure on the surface of the fluid head of the illustrated liquid will have a tendency to push solvent into the can if an opening is available. In the preferred embodiment of the invention this comprises the annular opening 62 covered by the disc valve 63. In order to shorten the path by which atmospheric pressure can reach the interior of the can 40, a small opening 64 is provided in the regulator 42 adjacent one of the particular air flow paths. In the illustrated embodiment, this opening has a diameter of about 0.020 inch.

The opening 62 also includes a solvent filter 65 for ensuring that no particulate material enters the housing 46 with the solvent.

As illustrated in the drawings, in the preferred embodiment, the housing 46 comprises a generally cylindrical flexible metal can with the solvent outlet shaft 52 positioned vertically therein with the respective first and second separable portions 53 and 54 of the shaft 52 being respectively fixed to the top and bottom portions of the can 46.

Similarly, in preferred embodiments, the solvent inlet filter is generally cylindrical, formed of a sintered metal such as bronze, and is positioned at lower portions of the housing. The disc valve 63 is immediately adjacent the filter and the opening 62 for preventing solvent that has entered the housing from exiting therefrom other than through the solvent outlet. The disc valve 63 is preferably formed of an appropriately flexible polymeric or rubber material.

The regulator 42 includes a series of passageways broadly designated at 66. In the illustrated embodiment the particular pattern reflects the nature of the manufacture and tooling used to produce the illustrated regulator 42, but is not otherwise limiting, other than the preferred provision of the opening 64, and the respective general paths for air and solvent. In a more preferred embodiment, one of the set screws used to close the openings formed during manufacture comprises an air bleed screw 67. By adjusting the screw 67, the rate and flow of compressed air from the source 41 to the pump 40 can be appropriately controlled.

FIG. 5 also illustrates that the pumping system is accompanied by a pressure transducer schematically illustrated at 43 which is connected to the regulator by the tubing 70. The operation of a transducer is well understood by those of ordinary skill in this art. Its preferred application however, is novel to the present invention, and to related application Ser. No. 07/766,810, filed concurrently herewith. In particular, if foamable material blocks the sintered tip of the cartridge 12, the air pressure will increase within the pumping system. The transducer measures this increase and gives an indication to the operator that remedial action must be taken.

Alternatively, should one of the compressed air lines become broken or dislodged, the pressure would drop within the system and the transducer 43 would likewise give an indication of this fact and the remedial action necessary.

As a further detail, the air hose 44 shown throughout the drawing is typically formed of the rubber norprene, an appropriate elastomeric polymer known to those familiar with this art and for which an appropriate substitute can be selected without undue experimentation. The solvent tubing 45 is likewise chosen typically of a polymeric material that is substantially chemically inert to the solvent and can likewise be selected without undue experimentation. In preferred embodiments, the solvent tubing 45 is formed of polytetrafluoroethylene or a related polymer. As illustrated in FIG. 5, the solvent tubing is preferably positioned coaxially within the air tubing 44.

Because the tubing is flexible, it is often helpful to hang the pump and tubing from the pump hanger 71 illustrated in FIG. 5. The hanger 71 can be fixed appropriately either in or adjacent to the solvent tank 11 illustrated in FIG. 1.

FIG. 5 also shows that the sintered metal filter 65 is fixed to the expandable housing 4 by an appropriate bolt 7 for which another connector such as a stud or rivet could of course, be equivalently substituted.

FIG. 5 also shows that in order to close the fluid outlet opening after solvent has been pumped, a pair of pins 73 can be included on the shaft 52 with one pin on lower portion 54 and the other pin on upper portion 53. A pair of linear springs 74 are attached to the pins 73 and provide a bias that urges the upper and lower portions 53 and 54 of the shaft 52 to close when the can 46 is not pressurized. It will be understood, however, that any other appropriate biasing system such as a coil spring or springs beneath the pins could likewise be appropriately substituted.

In the drawings and specification, there have been disclosed typically preferred embodiments of the invention and, although specific terms have been employed, they have been used in a generic and descriptive sense only and not for purposes of limitation, the scope of the invention being set forth in the following claims.

That which is claimed is:

1. A tip for a foam-in-place injection cartridge for directing a frothing mixture of cleaning solvent and air to the exit portions of the cartridge and comprising:

a generally cylindrical body formed if a material that is porous to gases and liquids, but that is impermeable to the foaming compositions which otherwise exit the injection cartridge;

a cylindrical core in said body that defines a mixing chamber for foamable compositions and through which a valving rod can pass to valve the dispensing of foamable compositions from the cartridge; and at least one circular face of said body forming a frusto-conical surface directed inwardly toward said body so that when a mixture of cleaning solvent and air is directed through said body, a frothing mixture of air and solvent will exit said frusto-conical surface to provide cleaning action over a linear dimension at least as great as the distance said frusto-conical surface faces inwardly in said body.

* * * * *

UNITED STATES PATENT AND TRADEMARK OFFICE
CERTIFICATE OF CORRECTION

PATENT NO. : 5,255,847
DATED : October 26, 1993
INVENTOR(S) : Sperry, et al.

It is certified that error appears in the above-identified patent and that said Letters Patent is hereby corrected as shown below:

On the title page, item [56]:
UNDER "REFERENCES CITED":

Under Reference No. 4,999,975, "Wilden" should be
-- Willden --

In the title, "FOAM IN PLACE" should be -- FOAM-IN-PLACE --

In Column 1, line 2, "FORM IN PLACE" should be FORM-IN-PLACE.
In column 2, line 33, "sealed" should be -- seal --

In column 2, line 51, "illustrated" be -- illustrate --

In column 3, line 3, "foam in place" should be
-- foam-in-place --

In column 3, line 4, after "at" insert -- 10 --

In column 3, line 5, "1" should be -- 11 --

In column 3, line 15, "Which" should be -- which --

In column 3, line 16, "6" should be -- 16 --

In column 3, line 22, "Core" should be -- core --

In column 4, line 49, "4" should be -- 40 --

In column 4, line 65, "4" should be -- 41 --

UNITED STATES PATENT AND TRADEMARK OFFICE
CERTIFICATE OF CORRECTION

PATENT NO. : 5,255,847
DATED : October 26, 1993
INVENTOR(S) : Sperry, et al.

It is certified that error appears in the above-identified patent and that said Letters Patent is hereby corrected as shown below:

In column 5, line 22, "can 46" should be -- pump 40 --

In column 5, line 49, after "application" insert a comma

In column 6, line 20, "4" should be -- 40 --

In column 6, line 21, "7" should be -- 72 --

In column 6, line 22, after "could" insert a comma

In column 6, line 29, "can 46" should be -- pump 40 --

In column 6, line 35, "typically" should be -- typical --

IN THE CLAIMS:

In column 6, line 44, "if" should be -- of --

Signed and Sealed this

Seventeenth Day of May, 1994

Attest:

BRUCE LEHMAN

Attesting Officer

Commissioner of Patents and Trademarks